US012553281B2

(12) United States Patent
Safstrom

(10) Patent No.: US 12,553,281 B2
(45) Date of Patent: Feb. 17, 2026

(54) SECURE DELIVERY DOOR KIT

(71) Applicant: RIS Industries LLC., San Antonio, TX (US)

(72) Inventor: Robert Safstrom, San Antonio, TX (US)

(73) Assignee: RIS Industries LLC., San Antonio, TX (US)

( * ) Notice: Subject to any disclaimer, the term of this patent is extended or adjusted under 35 U.S.C. 154(b) by 0 days.

(21) Appl. No.: 19/209,555

(22) Filed: May 15, 2025

(65) Prior Publication Data

US 2025/0354434 A1 Nov. 20, 2025

Related U.S. Application Data

(60) Provisional application No. 63/648,430, filed on May 16, 2024.

(51) Int. Cl.
*E06B 7/32* (2006.01)
*E06B 3/70* (2006.01)

(52) U.S. Cl.
CPC ........ *E06B 7/32* (2013.01); *E06B 2003/7057* (2013.01)

(58) Field of Classification Search
CPC .. E06B 1/6015; E06B 7/32; E06B 2003/7057; E06B 2003/7044; E06B 3/485; E06B 7/28
See application file for complete search history.

(56) References Cited

U.S. PATENT DOCUMENTS

| | | | | | |
|---|---|---|---|---|---|
| 1,023,425 | A | * | 4/1912 | Harrison | E05G 1/00 109/54 |
| 1,989,657 | A | * | 1/1935 | McCloud | E06B 3/485 160/116 |
| 3,211,367 | A | | 10/1965 | Jessop | |
| 3,226,781 | A | * | 1/1966 | Schnabel | E06B 1/6015 52/696 |
| 3,380,192 | A | * | 4/1968 | McKenna | E06B 5/16 49/141 |

(Continued)

FOREIGN PATENT DOCUMENTS

| | | |
|---|---|---|
| DE | 102012022240 | 12/2013 |
| KR | 100988848 B1 | 10/2010 |

*Primary Examiner* — Justin B Rephann

(74) *Attorney, Agent, or Firm* — Outlier Patent Attorneys, PLLC

(57) ABSTRACT

A secure delivery door kit includes a door assembly, a first type of attachment mechanism, and a second type of attachment mechanism. The door assembly is configured for being installed by a user in a desired installation location (such as a wall or a garage door) and the user selects which type of attachment mechanism to use, depending on the type of installation location the user chooses. The door assembly includes a door operatively coupled to a frame such that the door is configured to move relative to the frame between an open position and a closed position. The door assembly is configured for being installed in the installation location and used for secure package delivery. The attachment mechanisms are configured for attaching the door assembly to the installation location, and the second type of attachment mechanism is different from the first type of attachment mechanism.

12 Claims, 9 Drawing Sheets

(56) References Cited

U.S. PATENT DOCUMENTS

| | | | | | |
|---|---|---|---|---|---|
| 3,704,926 | A * | 12/1972 | Wariner | A47B 77/04 29/428 |
| 3,713,581 | A | 1/1973 | Mullens | |
| 4,648,550 | A | 3/1987 | Cleary, Jr. | |
| 4,754,797 | A * | 7/1988 | Sronce | E06B 7/32 160/354 |
| 5,020,450 | A | 6/1991 | Lichter | |
| 6,378,767 | B1 * | 4/2002 | Steele | A47G 29/22 232/19 |
| 7,240,823 | B1 | 7/2007 | Saidiazar | |
| 7,581,352 | B2 * | 9/2009 | Klingbyle | E06B 7/28 206/325 |
| 7,856,760 | B2 * | 12/2010 | Klingbyle | E06B 7/28 206/325 |
| 7,866,118 | B1 * | 1/2011 | Hamblin | E06B 5/003 160/369 |
| 7,882,662 | B2 * | 2/2011 | Root | E06B 1/6015 52/126.5 |
| 10,024,067 | B2 * | 7/2018 | Gordon | E04F 21/0015 |
| 10,413,106 | B1 * | 9/2019 | Valeriano | A47G 29/141 |
| 10,512,351 | B1 * | 12/2019 | Valeriano | E05B 47/0001 |
| 10,588,439 | B2 * | 3/2020 | Charbeneau | A47G 29/22 |
| 10,588,440 | B1 | 3/2020 | Kajgana | |
| 10,881,233 | B1 * | 1/2021 | Walsh | E06B 7/32 |
| 11,085,234 | B2 * | 8/2021 | Hunt | E06B 7/28 |
| 11,414,915 | B1 | 8/2022 | Cummings | |
| 2002/0070269 | A1 | 6/2002 | Rosiello et al. | |
| 2006/0236611 | A1 * | 10/2006 | Klingbyle | E06B 7/28 49/380 |
| 2006/0236623 | A1 * | 10/2006 | Klingbyle | E06B 7/28 52/204.5 |
| 2018/0199745 | A1 * | 7/2018 | Charbeneau | A47G 29/141 |
| 2018/0317687 | A1 | 11/2018 | Crooks | |
| 2019/0362576 | A1 | 11/2019 | Messina | |
| 2020/0035051 | A1 * | 1/2020 | Kane | G07C 9/00912 |
| 2020/0109596 | A1 | 4/2020 | Taylor et al. | |
| 2020/0154922 | A1 * | 5/2020 | Jeffs | A47G 29/28 |
| 2021/0079720 | A1 * | 3/2021 | Hunt | E06B 7/28 |
| 2023/0016190 | A1 * | 1/2023 | Safstrom | E06B 1/52 |
| 2024/0151099 | A1 * | 5/2024 | Frost | E06B 3/485 |
| 2024/0301748 | A1 * | 9/2024 | Pentecost | E06B 7/32 |

* cited by examiner

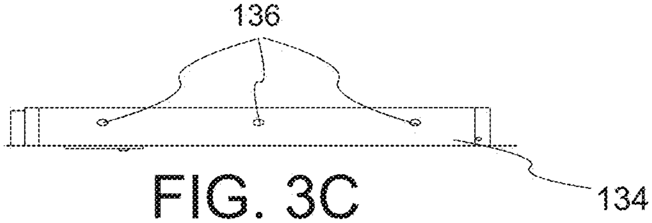
FIG. 3C
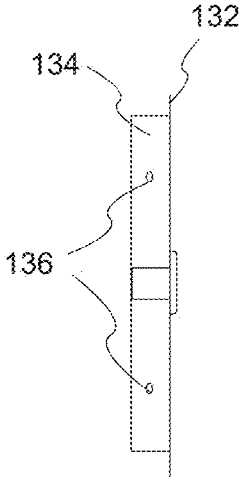
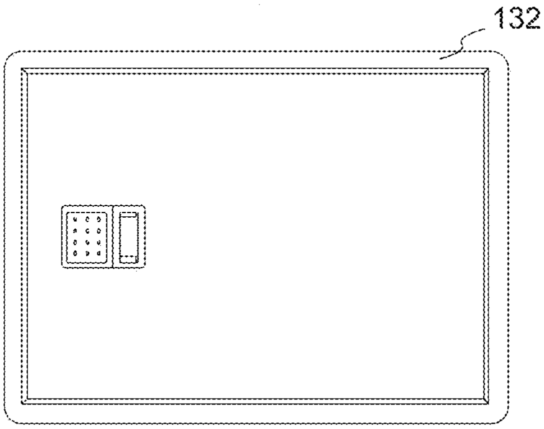
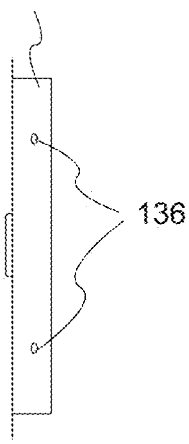
FIG. 3D FIG. 3A FIG. 3E
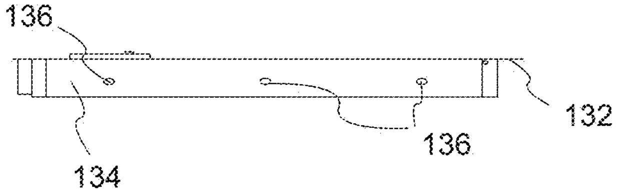
FIG. 3B

SECURE DELIVERY DOOR KIT

CROSS-REFERENCE TO RELATED APPLICATIONS

This application claims priority to U.S. Provisional Patent Application No. 63/648,430 filed on May 16, 2024, entitled "Secure Delivery Door Kit," the contents of which are incorporated herein by reference.

BACKGROUND

Field of the Art

The present disclosure is related to the field of secure delivery solutions, specifically focusing on a door kit that can be installed into various structures such as garage doors, wooden frame buildings, and metal buildings with slight framing modifications to enhance security against porch pirate theft.

Discussion of the State of the Art

The advent of e-commerce has revolutionized shopping, making it possible for consumers to purchase a wide range of goods from the comfort of their homes. However, this convenience has given rise to a new form of theft, colloquially referred to as "porch piracy." Porch pirates are individuals who steal packages left at recipients' doorsteps by delivery services. In 2022 alone, over 266 million packages were reported stolen, resulting in lost and stolen claim payouts of approximately $19.6 billion. This issue has been highlighted by various major news outlets, yet no effective solution has been proposed to curb this growing problem.

The impact of porch piracy extends beyond the financial losses. For instance, consider the case of a veteran who relies on scheduled deliveries for medication. If a porch pirate is aware of the delivery schedule and steals the medication, the veteran is left in a precarious situation, having to navigate the process of getting the prescription resent. Such instances underscore the urgency and necessity of finding a solution to this problem.

Existing attempts to mitigate porch piracy have proven to be largely ineffective. Some of the proposed solutions include having packages delivered to the recipient's place of work, asking delivery drivers to hide packages behind bushes or planters, or placing them under a bench. However, these methods are not foolproof, as they rely heavily on the discretion of delivery drivers and the presence of suitable hiding places.

Another proposed solution is the use of pickup lockers, such as those offered by some popular online retailers at local convenience stores. However, these locations are often situated in areas with high transient populations, making them less than ideal for many consumers. Furthermore, if a porch pirate becomes aware of a scheduled delivery, they can easily plan to steal the package, regardless of the preventive measures in place.

In summary, the problem of porch piracy is a significant and growing issue that has yet to be effectively addressed. Current solutions are either impractical, unreliable, or inconvenient, leaving consumers vulnerable to theft and the associated financial and personal losses.

SUMMARY

The present invention is a secure delivery door kit. The kit is a comprehensive solution designed to combat the growing issue of porch piracy, which has resulted in financial losses amounting to nearly $20 billion annually. The kit provides a secure delivery system that can be installed by a user, which ensures that packages are safely delivered and stored out of sight, thereby eliminating the risk of theft.

The secure delivery door kit is a fully assembled, easy-to-install system that can be fitted into a garage door, metal building, or wood-framed building. The kit includes a door assembly, cutting template, L-shaped bracing brackets, and wooden screws, enabling a quick and secure installation. The door assembly features a keypad with Bluetooth and Wi-Fi compatibility, allowing homeowners to set a unique delivery code for each delivery.

When placing online orders for delivery, homeowners instruct delivery drivers to enter the code into the keypad on the delivery door. Upon entering the correct code, the door opens, allowing the delivery person to place the package safely inside the garage or building. The door locks automatically once closed, requiring a new code for subsequent access. This ensures that packages are securely stored, protected from weather elements, and out of sight, thereby deterring porch pirates.

The door kit in accordance with the present invention provides significant benefits, including enhanced security for delivered packages, reduction in lost and stolen claims, and increased convenience for homeowners, especially the elderly who increasingly rely on home deliveries. By preventing porch pirates from accessing the packages, the security door can significantly reduce the financial burden of theft on consumers, retailers, and delivery carriers.

In one example, the invention is a secure delivery door kit that includes a door assembly, a first type of attachment mechanism, and a second type of attachment mechanism. The door assembly includes a door operatively coupled to a frame. The door is configured to move relative to the frame between an open position and a closed position. The door assembly is configured for being installed in an installation location. The first type of attachment mechanism and the second type of attachment mechanism are configured for attaching the door assembly to the installation location. The second type of attachment mechanism is different from the first type of attachment mechanism. The kit may further include a cutting template for guiding a user in cutting an opening in the installation location. The door may include a keypad operatively coupled to a lock. Inputting a code into the keypad may cause the lock to move from a locked position to an unlocked position. The frame of the door assembly may include an outer peripheral portion and an inwardly extending flange portion that is perpendicular to the outer peripheral portion. The inwardly extending flange portion may include a plurality of frame openings positioned at intervals around a perimeter of the inwardly extending flange portion. The first type of attachment mechanism and the second type of attachment mechanism may be sized and shaped to be positioned within the frame openings. The installation location may be a wood frame wall and the first type of attachment mechanism may include a plurality of wood screws and a corresponding plurality of wall anchors. The second type of attachment mechanism may include a plurality of L-shaped bracing brackets, a corresponding plurality of set screws, and a corresponding plurality of bracing bolts. Each one of the L-shaped bracing brackets may have a short side having one opening and a long side having two openings. Each one of the bracing bolts may have a flat head, a threaded shaft, a distal end opposite of the flat head, and a drive recess in the distal end. The kit may further include a screwdriver that is compatible with the drive recess in the distal ends of the bracing bolts. When the door assembly is installed in the installation location, the outer peripheral portion of the frame may be on the outside surface of the installation location and the plurality of bracing bolts may be on the inside of the installation location with the installation location sandwiched between the flat heads of the bracing bolts and the outer peripheral portion of the frame. The plurality of L-shaped bracing brackets may be attached to the plurality of frame openings by using the corresponding plurality of set screws. The corresponding plurality of set screws may be coupled to the plurality of frame openings and to a selected one of the two openings in the long side of the plurality of L-shaped bracing brackets.

In another example, the invention is a secure delivery door kit for a user to install a delivery door in an installation location for secure delivery of packages at the installation location. The kit includes a door assembly that includes a door operatively coupled to a frame and configured to move relative to the frame between an open position and a closed position. The frame has a plurality of frame openings positioned around a perimeter of the frame. The kit further includes a respective plurality of set screws that are sized and shaped to be coupled to the plurality of frame openings, a respective plurality of L-shaped bracing brackets, and a respective plurality of bracing bolts. Each one of the L-shaped bracing brackets has two attachment openings, and is configured to attach to one of the frame openings by screwing one of the set screws to a selected one of the attachment openings and the one of the frame openings. Each one of the bracing bolts has a flat head, a threaded shaft, a distal end opposite of the flat head, and a drive recess in the distal end. Each one of the L-shaped bracing brackets has one bolt opening sized and shaped for the threaded shaft of the bracing bolt to be positioned therein. Each one of the L-shaped bracing brackets has a short side and a long side. The two attachment openings are on the long side and the one bolt opening is on the short side. When the door assembly is installed, the installation location is sandwiched between the frame of the door assembly and the flat heads of the plurality of bracing bolts. The frame of the door assembly may have an outer peripheral portion and an inwardly extending flange portion that is perpendicular to the outer peripheral portion. The plurality of frame openings may be in the inwardly extending flange portion. When the door assembly is installed, the installation location may be sandwiched between the outer peripheral portion of the frame and the flat heads of the plurality of bracing bolts.

Overall, the door kit offers a practical, reliable, and effective solution to the problem of porch piracy. The door kit is designed to meet the growing demand for secure home deliveries, ensuring that packages are safely delivered and stored until retrieved by the homeowner.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIGS. 3A-3E are front, bottom, top, left side, and right side views, respectively of a door assembly, in accordance with an aspect of the present invention.

DETAILED DESCRIPTION

Figure 1:
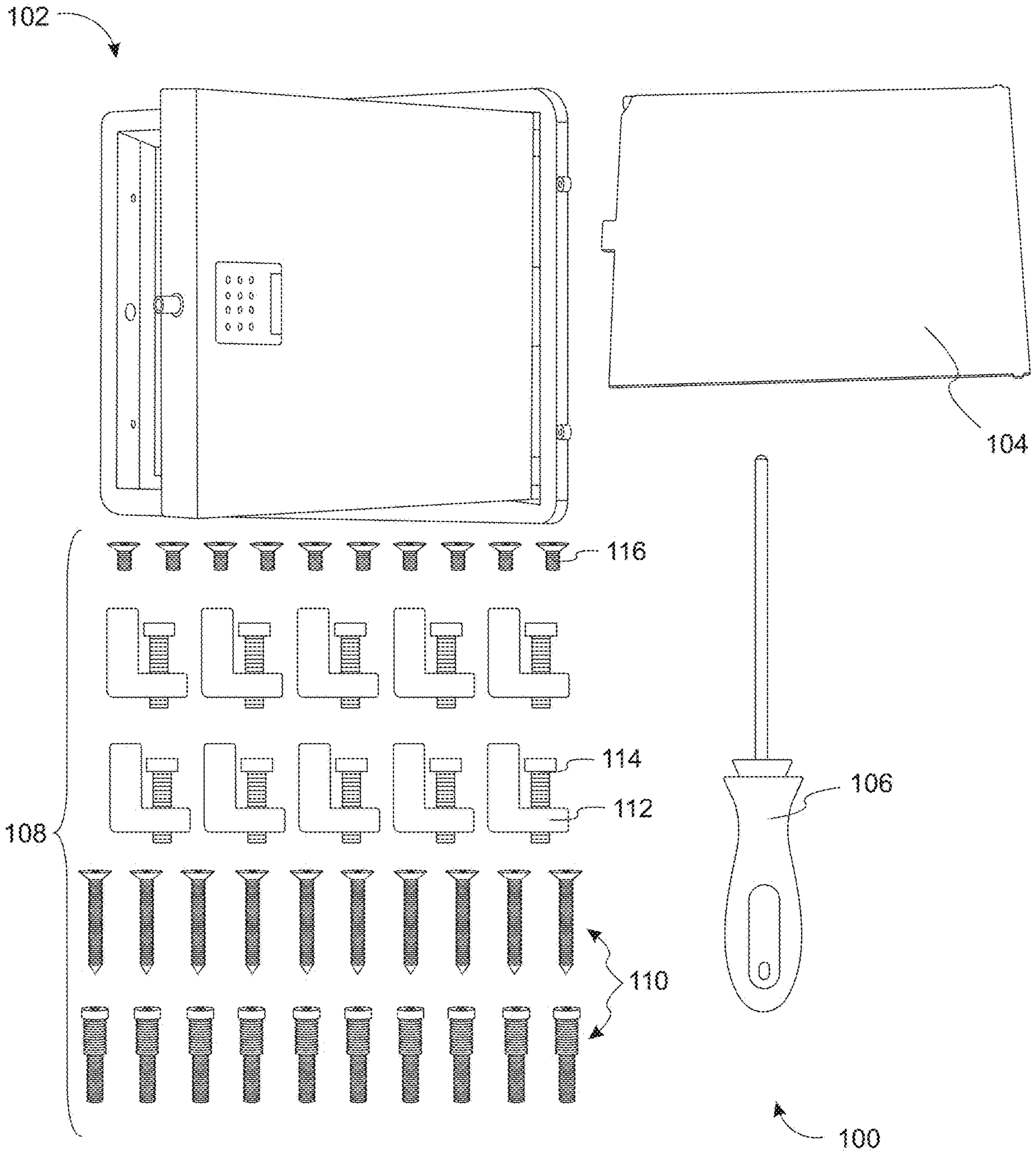
FIG. 1 illustrates a secure delivery door kit, in accordance with an aspect of the present invention.

The present invention is for a secure delivery door kit that includes a delivery door designed to be installed by a user to prevent porch pirate thefts. The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Apparatus

The secure delivery door kit 100, shown in FIG. 1, includes a delivery door assembly 102, a cutting template 104, a tool 106 to facilitate installation of the delivery door assembly 102, and a plurality of fasteners 108 for attaching the door assembly 102 to the desired location. In one example, the kit 100 includes two different types of fasteners so that the user can select the appropriate type of fastener needed for the desired installation location. However, the door kit 100 may alternatively include only one type of fastener or three or more types of fasteners. The plurality of fasteners may include wood screw and plug sets 110 for installing the door assembly 102 in a wood frame building. Additionally or alternatively, the fasteners 108 may include a plurality of L-shaped bracing brackets 112, a corresponding plurality of bracing bolts 114, and a corresponding plurality of locking screws 116 for attaching the door assembly 102 to a metal garage door or similar installation location having a relatively thin wall.

Figure 2A:
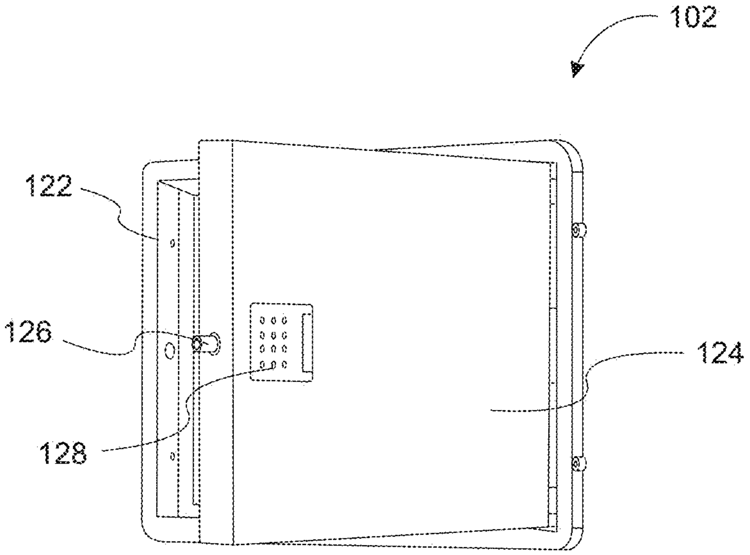
FIGS. 2A and 2B are perspective views of a door assembly, in accordance with aspects of the present invention.
Figure 2B:
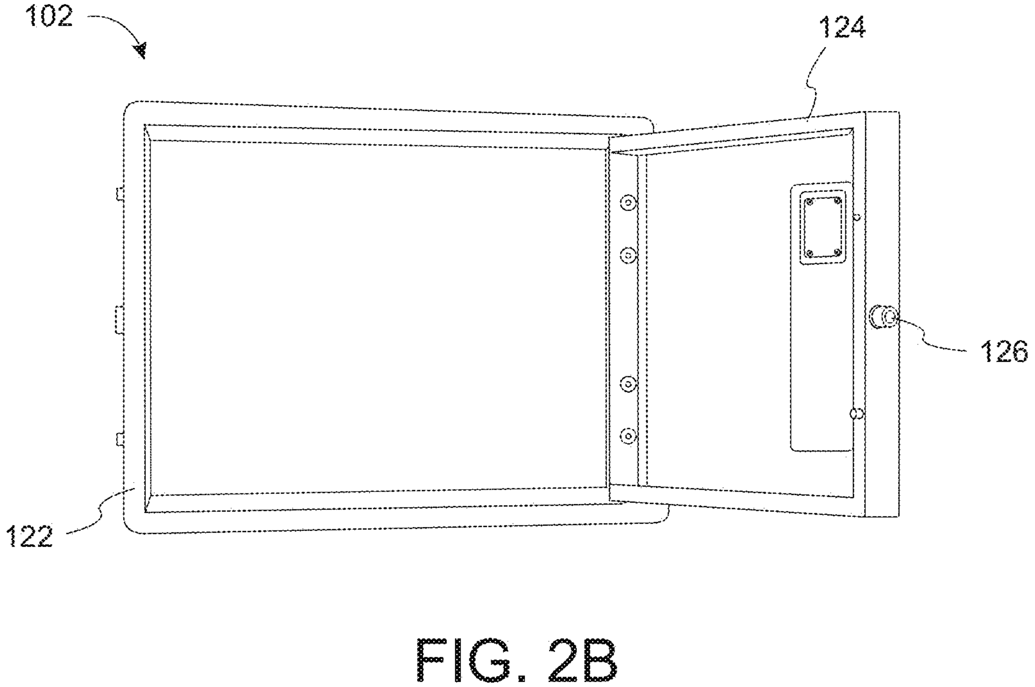

The door assembly 102 is discussed in more detail with reference to FIGS. 2A and 2B. The door assembly 102 generally includes a frame 122 and a door 124 operatively coupled to the frame 122 and configured to move relative to the frame 122 between an open position and a closed position. In one example, the door 124 is coupled to the frame 122 with hinges and is configured to pivot between the open position and the closed position. The hinges may be positioned so that the door 124 swings open to the left, to the right, downwards, or upwards. In another example, the door 124 is coupled to the frame 122 with a slide mechanism and is configured to slide up and down or laterally between the open position and the closed position.

The door assembly 102 is made of a material that is lightweight and robust so that the weight of the door assembly 102 does not interfere with the opening and closing of a garage door to which the door assembly 102 may be attached. For example, the door 124 and the frame 122 may be made of aluminum or other similarly lightweight materials. The door assembly 102 may weigh less than 8 pounds. The door 124 and/or the frame 122 may include a rubber sealing gasket for preventing or minimizing leaking through the door 124.

The door 124 includes a locking mechanism for locking the door 124 in the closed configuration. For example, the door 124 may include a lock 126 that is controlled with a keypad 128. The front-mounted keypad 128 may be Bluetooth and Wi-Fi connected, allowing for remote access and control. The lock 126 may be a piston vault style bolt lock that can only be opened by entering the correct code into the keypad 128. The lock 126 is self-locking when the door 124 is shut.

The keypad 128 with the piston vault lock 126 is an advantageous feature of the door assembly 102. The lock 126 is designed to be robust and secure, deterring any potential thieves from attempting to break into the garage through the installed delivery door 124. The lock 126 is controlled by the keypad 128, which can be programmed by the user. When placing an order for a home delivery, the user may leave delivery instructions for the delivery person. The delivery instructions would include the code to be entered into the keypad 128. If the code is input correctly, the lock 126 will retract to the unlocked position and the door 124 will swing open, allowing the delivery person to place the packages inside the garage or building. Once the door 124 is closed, the lock 126 will automatically extend to the locked position, thereby locking the door 124 closed and keeping the delivery out of sight and protected from the weather. However, the door assembly 102 is not limited to the bolt style lock depicted in FIGS. 2A and 2B and the door 124 may include any other type of locking mechanism that is effective for locking the door 124 in the closed position relative to the frame 122.

The frame 122 is the portion of the door assembly 102 that attaches to the garage door, wall, or other desired installation location. When installed, the frame 122 is in direct contact with the outside surface of the installation location. As shown in FIGS. 3A-3E, the frame 122 includes an outer peripheral planar portion 132 that is parallel to, and in direct contact with, the outside surface of the installation location. The outer peripheral portion 132 is in the same plane as the front surface of the door 124. The frame 122 further includes an inwardly extending flange portion 134 that extends into the package delivery opening in the installation location. The inwardly extending flange portion 134 is perpendicular to, and continuous with, the outer peripheral planar portion 132. The outer frame 132 and the inwardly extending flange 134 are fixedly coupled to each other and may advantageously be made from a continuous unitary piece. While the outer frame 132 is a solid piece, the inwardly extending flange 134 has a plurality of frame openings 136 extending therethrough. The frame openings 136 are positioned around the periphery of the inwardly extending flange 134. In the illustrated example, the inwardly extending flange 134 includes three frame openings 136 along each of the top and the bottom and two frame openings 136 along each one of the sides. However, the invention is not limited to the illustrated quantity and configuration of the frame openings 136. Rather, the inwardly extending flange 134 may have more or fewer than ten frame openings and the frame openings may be positioned in other locations around the inwardly extending flange 134. The frame openings 136 accommodate the fasteners 108 for attaching the door assembly 102 to the installation location.

In order to install the door assembly 102, the user must first cut a hole in the desired installation location. The cutting template 104 can advantageously be used to accurately determine the position and size of the opening to be cut in the installation location. In one example, the cutting template 104 is a piece of cardboard included in the packaging of the kit 100. The cutting template 104 has a size and shape that is substantially the same as the size and shape of the opening that must be cut in the installation location in order to install the door assembly 102. The user may position and re-position the cutting template 104 until they are satisfied with the installation location. Next, the user traces an outline around the periphery of the cutting template 104 and then cuts through the wall or garage door along the cutting template outline. Finally, the frame 122 is positioned in the opening created by the user and fastened into place using the provided fasteners 108. In particular, the inwardly extending flange 134 extends into the opening that is cut in the installation location and the outer frame 132 is flush with the outside surface of the installation location.

If the installation location is a wood framed wall, the user would select the wood screw and plug sets 110 for attaching the door assembly 102 to the installation location. The wood screws may be screwed through the frame openings 136 and into the wall.

Figure 4A:
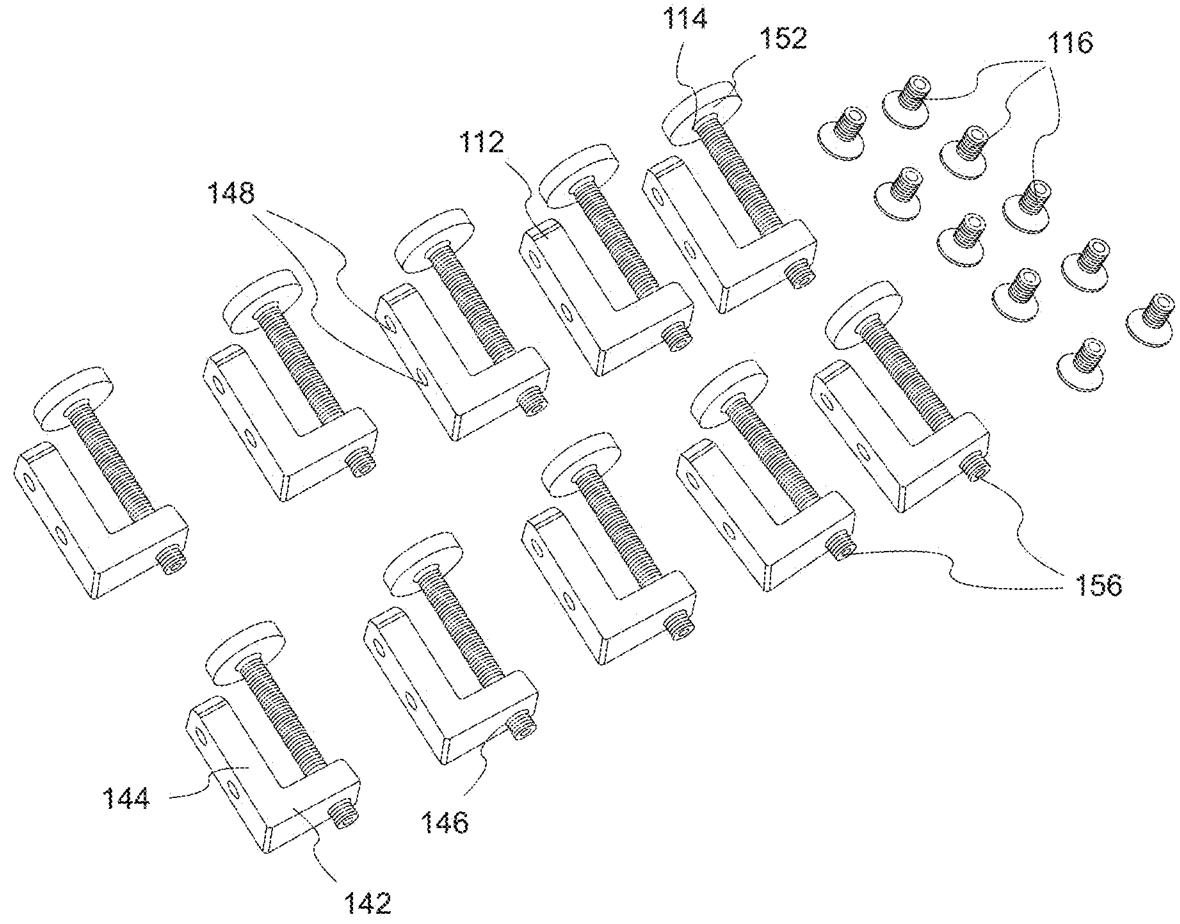
FIG. 4A illustrates a plurality of attachment mechanisms for attaching the door assembly to an installation location, in accordance with an aspect of the present invention.
Figure 4B:
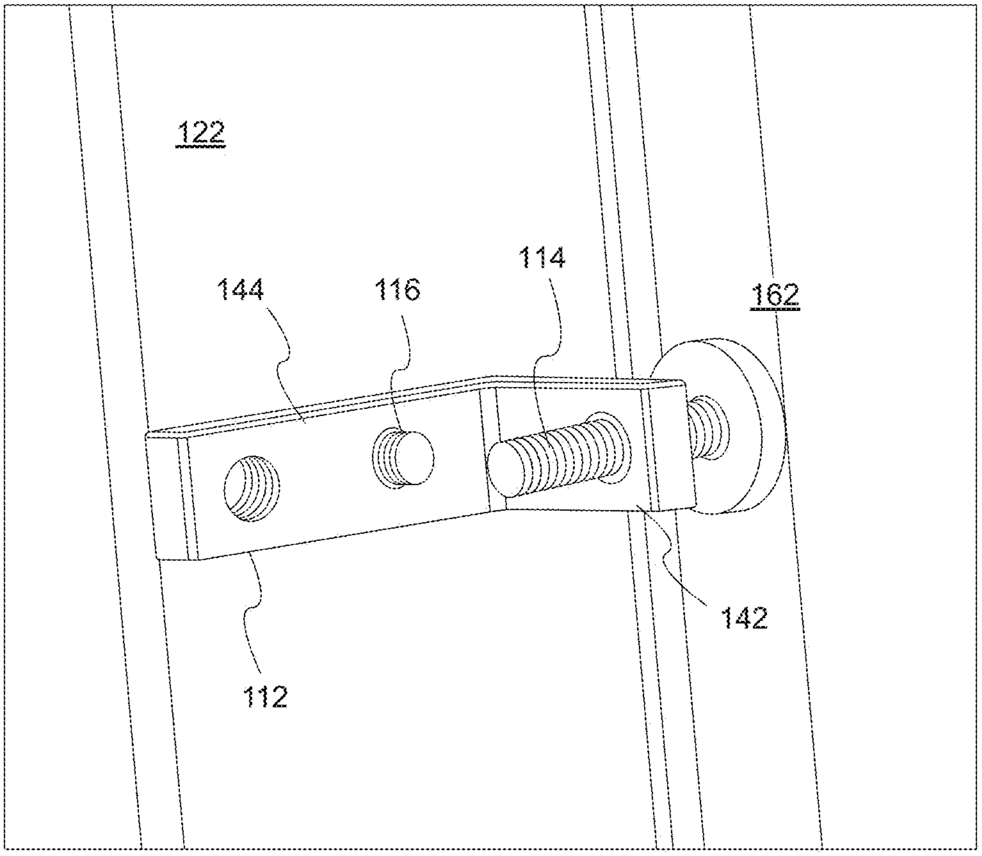
FIGS. 4B-4D illustrate the door assembly attached to the installation location using the attachment mechanism, in accordance with an aspect of the present invention.
Figure 4C:
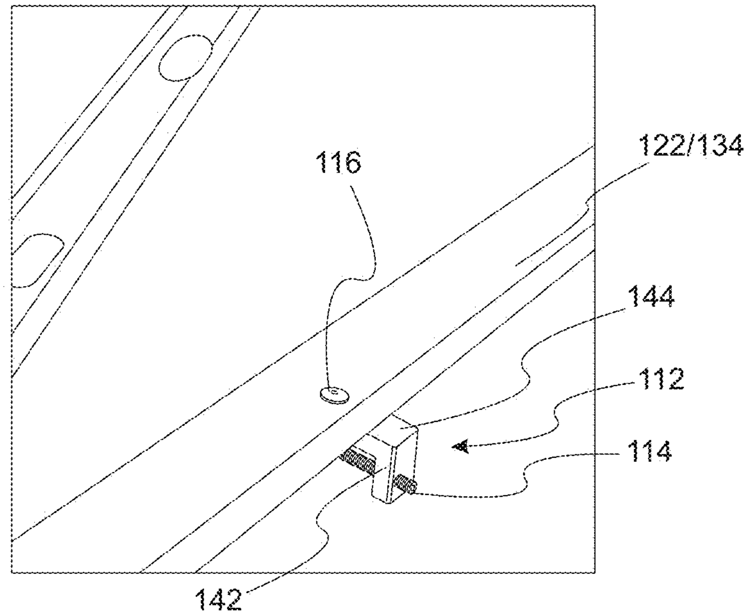
Figure 4D:
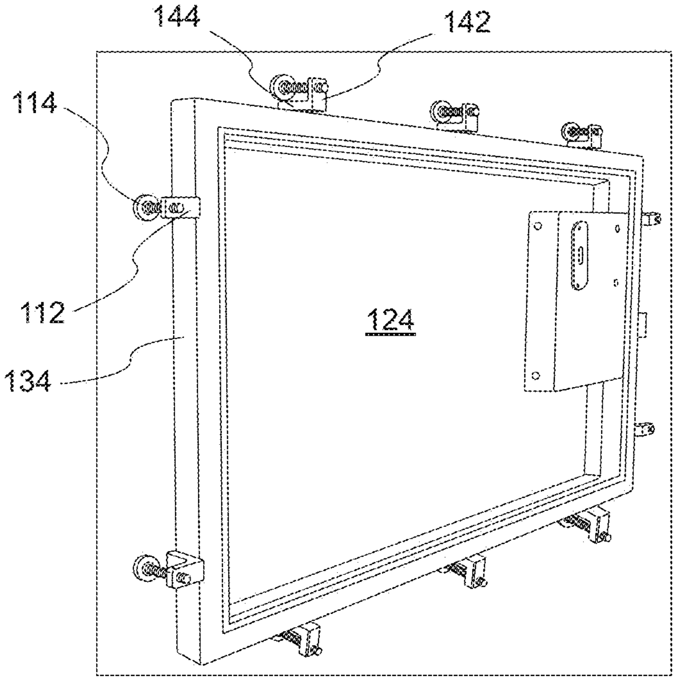
Figure 4E:
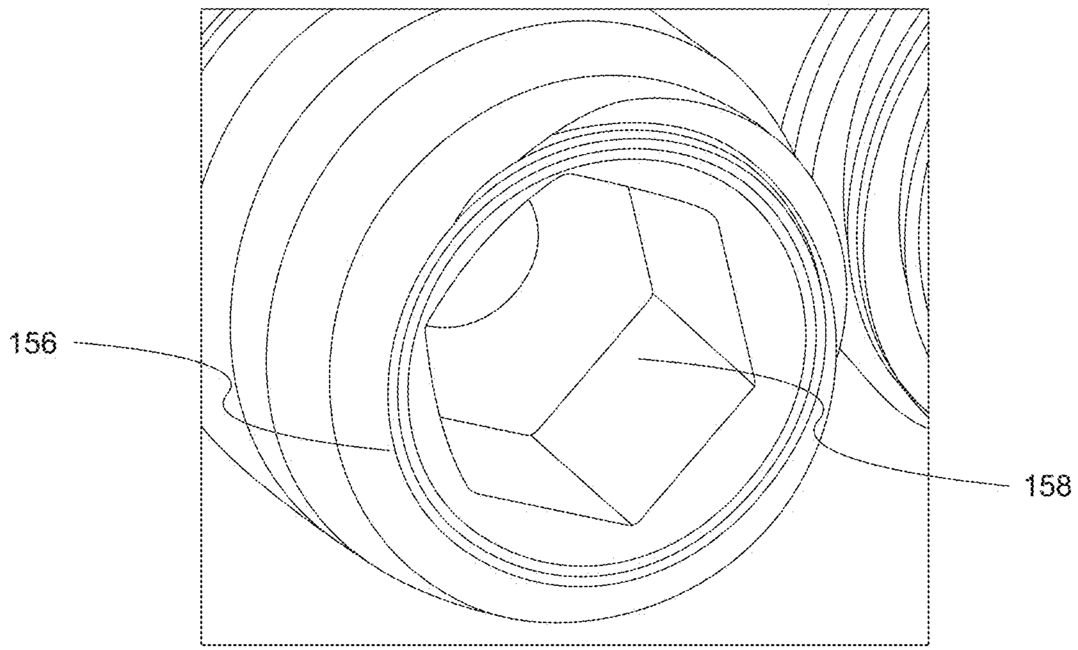
FIG. 4E illustrates a drive recess in a distal end of a bracing bolt, in accordance with an aspect of the present invention.
Figure 4F:
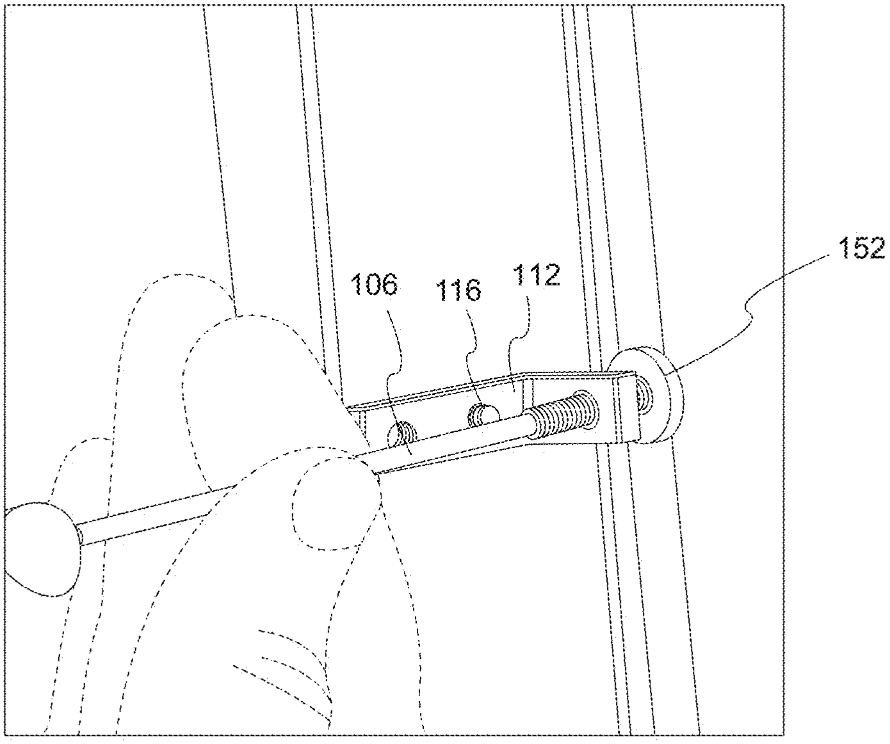
FIG. 4F illustrates a step in the process of attaching the door assembly to the installation location, in accordance with an aspect of the present invention.

If the installation location is a metal garage door or similar installation location, the L-shaped bracing brackets 112, bracing bolts 114, and locking screws 116 are used for attaching the door assembly to the installation location, as discussed in more detail with reference to FIGS. 4A-4F. As shown in FIG. 4A, the L-shaped fixing brackets 112 include a short side 142 perpendicular to a long side 144. The short side 142 includes a threaded bolt opening 146 through which the bracing bolts 114 extend. The long side 144 includes two threaded attachment openings 148 configured for accommodating the locking screws 116. The locking screws 116 are used to attach the bracing brackets 112 to the frame 122 of the door assembly 102, as shown in FIGS. 4B and 4C. The bracing bolts 114 are used to attach the door assembly 102 to the installation location without drilling or cutting any more holes in the installation location. The fixing bolts 114 have a wide, flat head 152, a threaded shaft 154, a distal end 156, and a drive recess in the distal end 156. An example of the drive recess 158 in the distal end 156 of the bracing bolt 114 is shown in FIG. 4E. Although the drive recess 158 is depicted as being a hex drive, the invention is not limited to a hex drive and the drive recess 158 may be any other type of drive recess. The tool 106 may be a screwdriver that is compatible with the drive recess 158. The bracing bolt 114 is screwed into the threaded bolt opening 146 in the short side 142 of the fixing bracket 112 and then tightened down, as shown in FIG. 4F, with the installation location (e.g., garage door, wall, etc.) sandwiched between the flat head 152 of the fixing bolt 114 and the underside of the outer peripheral portion 132 of the frame 122.

The bracing bracket 112 may be attached to the frame 122 of the door assembly 102 in different positions in order to accommodate different thicknesses of the installation location. For example, if the door assembly 102 is installed in an insulated garage door, the bracing bracket 112 is attached to the frame 122 of the door assembly 102 in a manner that can accommodate the greater thickness of the insulated garage door. In another example, if the door assembly 102 is installed in an uninsulated metal garage door, the bracing bracket 112 is attached to the frame 122 in a manner that can accommodate the smaller thickness of the garage door.

As shown in FIG. 4B, the bracing bracket 112 is attached to the frame 122 of the door assembly 102 with the short side 142 positioned towards the installation location 162 and the long side 144 facing away from the installation location 162. With this arrangement, the door assembly 102 can be attached to a relatively thin installation location 162, such as a metal garage door. In another example, shown in FIGS. 4C and 4D, the bracing bracket 112 is attached to the frame 122 of the door assembly 102 with the short side 142 positioned away from the installation location 164 and the long side facing towards the installation location 164. With this arrangement, the door assembly 102 can be attached to a relatively thick installation location 164, such as an insulated garage door. In another example, the bracing brackets 112 can be attached to the frame 122 using either one of the attachment openings 148 in the long side 144 of the bracket 112, depending on the thickness of the installation location. In other words, a user would select one of the attachment openings 148 based on the thickness of the installation location. The bracing brackets 112 are designed to allow up to 2 inches of space for tightening the bracing bolts 114, thereby accommodating both insulated garage doors, which are typically 2 inches thick, and standard garage doors, which are typically 0.023 inches thick.

One advantage of using the bracing brackets 112 and bracing bolts 114 to attach the door assembly 102 to the installation location is that additional holes do not have to be drilled or cut in the installation location. Rather, the door assembly 102 is held in place by clamping the installation location (e.g., wall, door, etc) between the flat head 152 of the bracing bolts 114 and the underside of the outer portion 132 of the frame 122.

Figure 5:
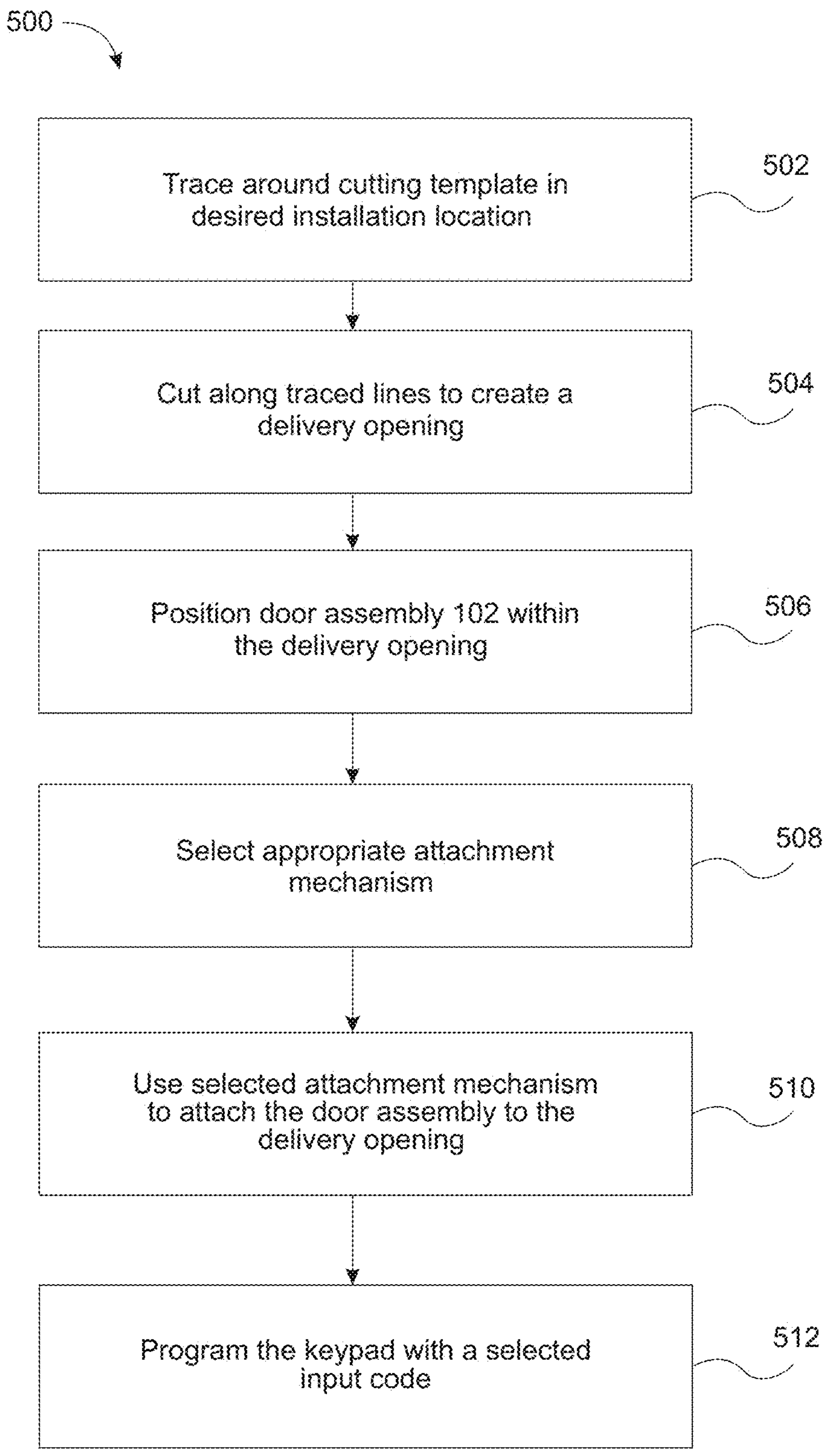
FIG. 5 is a flow chart of a method for using a secure delivery door kit, in accordance with an aspect of the present invention.

A method 500 of using the kit 100 is depicted in FIG. 5. First, in step 502, the user selects an installation location and applies the cutting template 104 to the desired installation location. Using the cutting template 104, the user traces around the perimeter to outline the location of the door installation. Next, in step 504, the user cuts along the traced lines to create a delivery opening. Next, in step 506, the user positions the door assembly 102 in the delivery opening with the inwardly extending flange 134 extending into the opening and the outer frame portion 132 positioned flush against the outer surface of the installation location. Next, in step 508, the user selects which one of the attachment mechanisms should be used to attach the door assembly 102 to the installation location. The selection of the appropriate attachment mechanism depends on the type of installation location. For example, if the installation location is a wood framed wall, the user would select the wood screw and plug sets 110. If the installation location is a metal garage door, the user would select the bracing brackets 112, bracing bolts 114, and locking screws 116. Next, in step 510, the selected attachment mechanisms are used to attach the door assembly 102 to the installation location. After the door assembly 102 is installed, the user may, in step 512, program the keypad with a desired input code that can be used to unlock and open the door 124.

Figure 6:
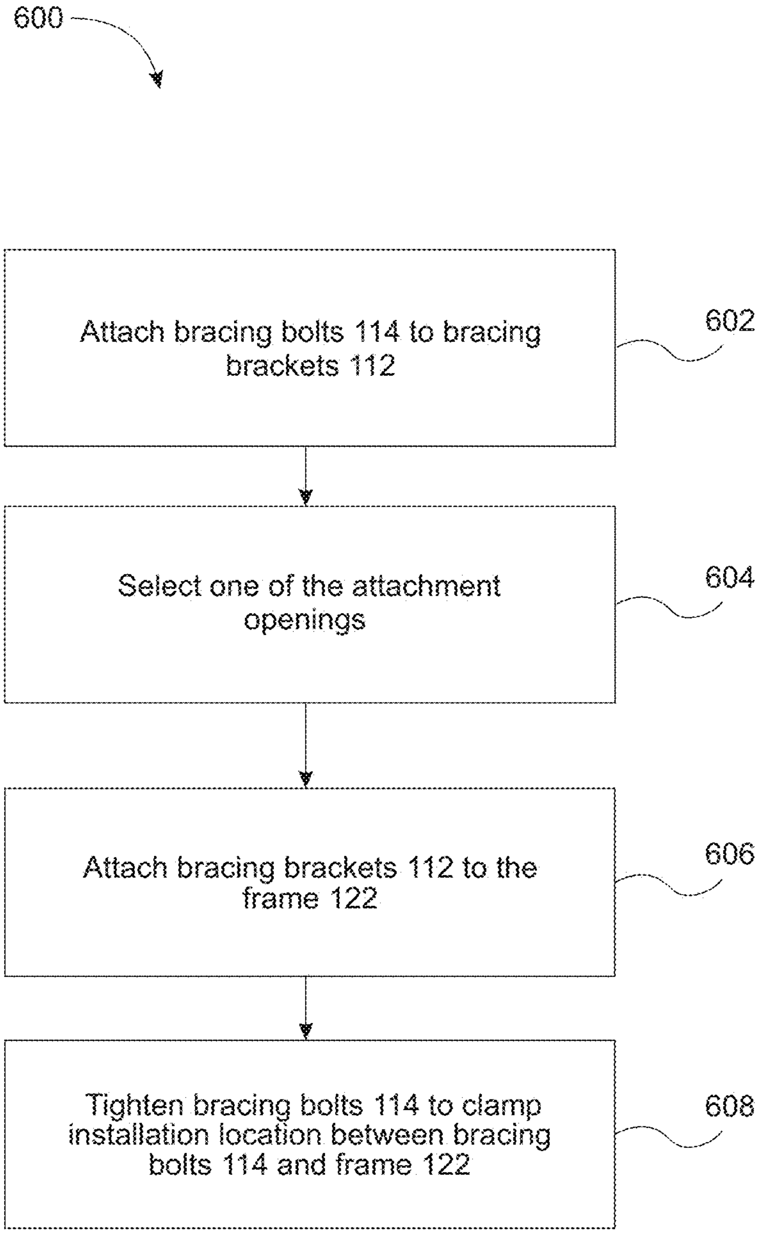
FIG. 6 is a flow chart of a method for attaching a door assembly to a delivery opening, in accordance with an aspect of the present invention.

The step 510 of attaching the door assembly 102 to the delivery opening may include several steps. In particular, a method 600 of attaching the door assembly 102 to a metal garage door using the bracing brackets 112, bracing bolts 114, and locking screws 116 is depicted in FIG. 6. First, in step 602, the bracing bolts 114 are screwed into the threaded bolt openings 146 in the short side 142 of the bracing brackets 112 with the flat heads 152 extending away from the long side 144 (as shown in FIG. 4B) or positioned adjacent to the long side 144 (as shown in FIGS. 4C and 4D). The position of the bracing bolts 114 relative to the bracing brackets 112 depends on the thickness of the installation location. Next, in step 604, the user selected which one of the attachment openings 148 should be used to attach the bracing brackets 112 to the frame 122 of the door assembly 102. The selection of which attachment opening 148 to use is based on the thickness of the installation location. Next, in step 606, the bracing brackets 112 are attached to the frame 122 by screwing the locking screws 116 through the frame opening 136 and into the selected attachment opening 148. Finally, in step 608, the bracing bolts 114 are tightened towards the installation location (as shown in FIG. 4F) in order to clamp the installation location between the bracing bolts 114 and the frame 122, thereby retaining the door assembly 102 in the installation location.

The secure delivery door kit 100 provides a solution to the problem of secure package delivery that is user-friendly and easy to install. Installation of the delivery door assembly 102 advantageously requires minimal cutting and drilling. Further, the kit 100 includes parts for installing the delivery door assembly 102 in various desirable locations, such as in a wall or a garage door.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A secure delivery door kit, comprising:

a door assembly comprising a door operatively coupled to a frame such that the door is configured to move relative to the frame between an open position and a closed position, wherein the door assembly is configured for being installed in an installation location, and wherein the frame of the door assembly comprises an outer peripheral portion and an inwardly extending flange portion that is perpendicular to the outer peripheral portion, wherein the inwardly extending flange portion comprises a plurality of frame openings positioned at intervals around a perimeter of the inwardly extending flange portion;

a plurality of L-shaped bracing brackets;

a corresponding plurality of set screws, wherein the set screws are sized and shaped to fit in the frame openings in the frame of the door assembly; and a corresponding plurality of bracing bolts.

2. The secure delivery door kit of claim 1, further comprising a cutting template for guiding a user in cutting an opening in the installation location.

3. The secure delivery door kit of claim 1, wherein the door comprises a keypad operatively coupled to a lock such that inputting a code into the keypad causes the lock to move from a locked position to an unlocked position.

4. The secure delivery door kit of claim 1, wherein each one of the L-shaped bracing brackets comprises a short side having one opening and a long side having two openings.

5. The secure delivery door kit of claim 4, wherein the plurality of L-shaped bracing brackets are attached to the plurality of frame openings by using the corresponding plurality of set screws.

6. The secure delivery door kit of claim 5, wherein the corresponding plurality of set screws are coupled to the plurality of frame openings and to a selected one of the two openings in the long side of the plurality of L-shaped bracing brackets.

7. The secure delivery door kit of claim 1, wherein each one of the bracing bolts comprises a flat head, a threaded shaft, a distal end opposite of the flat head, and a drive recess in the distal end.

8. The secure delivery door kit of claim 7, further comprising a screw driver that is compatible with the drive recess in the distal ends of the bracing bolts.

9. The secure delivery door kit of claim 7, wherein, when the door assembly is installed in the installation location, the outer peripheral portion of the frame is on the outside surface of the installation location and the plurality of bracing bolts are on the inside of the installation location with the installation location sandwiched between the flat heads of the bracing bolts and the outer peripheral portion of the frame.

10. A secure delivery door kit for a user to install a delivery door in an installation location for secure delivery of packages at the installation location, the kit comprising:

a door assembly comprising a door operatively coupled to a frame and configured to move relative to the frame between an open position and a closed position, wherein the frame comprises a plurality of frame openings positioned around a perimeter of the frame;

a respective plurality of set screws that are sized and shaped to be coupled to the plurality of frame openings;

a respective plurality of L-shaped bracing brackets, wherein each one of the L-shaped bracing brackets comprises two attachment openings, and wherein each one of the L-shaped bracing brackets is configured to attach to one of the frame openings by screwing one of the set screws to a selected one of the attachment openings and the one of the frame openings; and a respective plurality of bracing bolts, wherein each one of the bracing bolts comprises a flat head, a threaded shaft, a distal end opposite of the flat head, and a drive recess in the distal end, wherein each one of the L-shaped bracing brackets comprises one bolt opening sized and shaped for the threaded shaft of the bracing bolt to be positioned therein, wherein each one of the L-shaped bracing brackets comprises a short side and a long side, wherein the two attachment openings are in the long side and the one bolt opening is in the short side, and wherein, when the door assembly is installed, the installation location is sandwiched between the frame of the door assembly and the flat heads of the plurality of bracing bolts.

11. The secure delivery door kit of claim 10, wherein the frame of the door assembly comprises an outer peripheral portion and an inwardly extending flange portion that is perpendicular to the outer peripheral portion, wherein the plurality of frame openings are in the inwardly extending flange portion.

12. The secure delivery door kit of claim 11, wherein, when the door assembly is installed, the installation location is sandwiched between the outer peripheral portion of the frame and the flat heads of the plurality of bracing bolts.

* * * * *